Feb. 23, 1971 R. J. CHABAN 3,565,534
MICROSCOPE SYSTEM WITH INFORMATIONAL MODULAR AIDS
Filed July 19, 1968 2 Sheets-Sheet 1
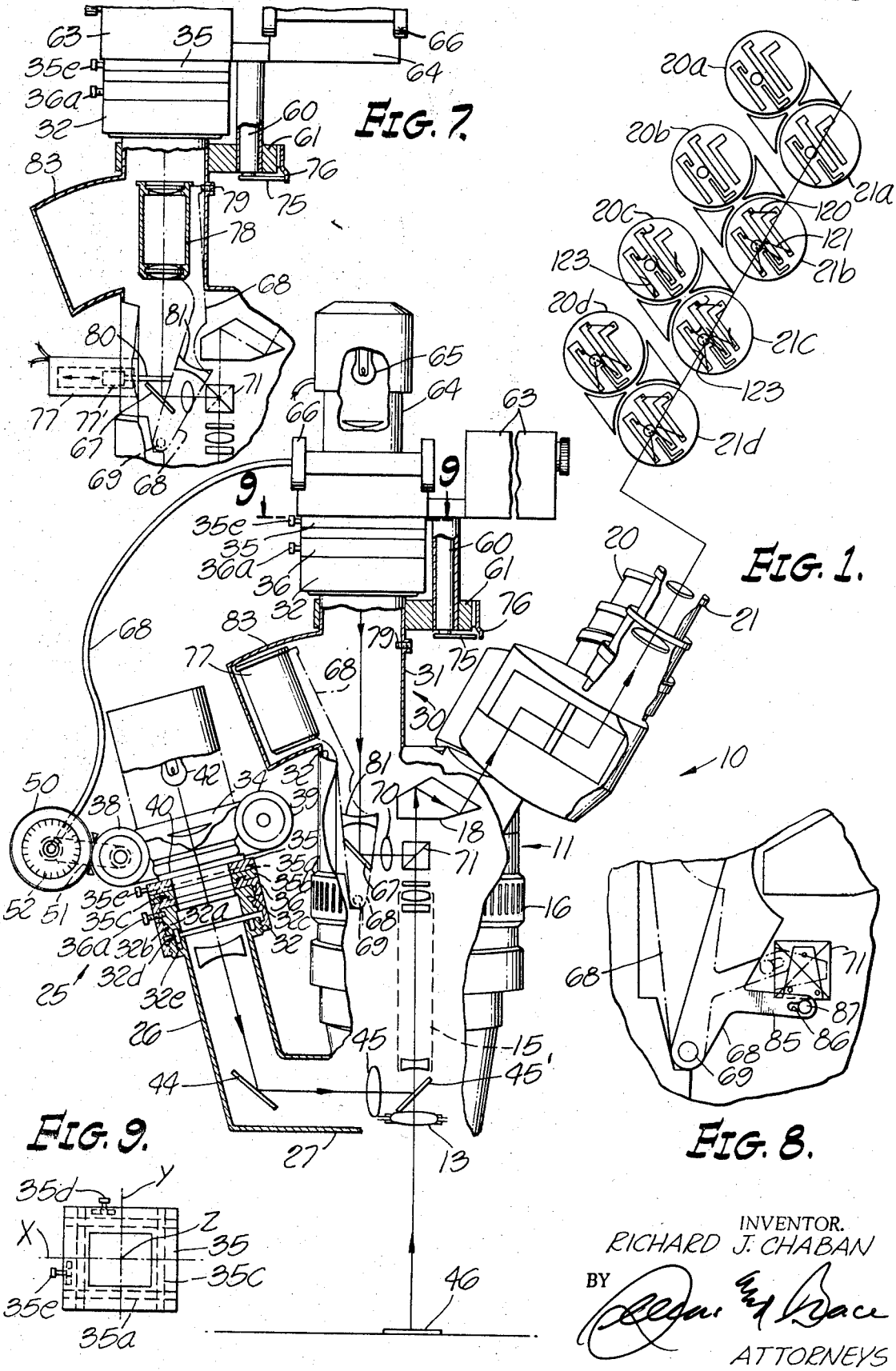
INVENTOR.
RICHARD J. CHABAN
BY
ATTORNEYS

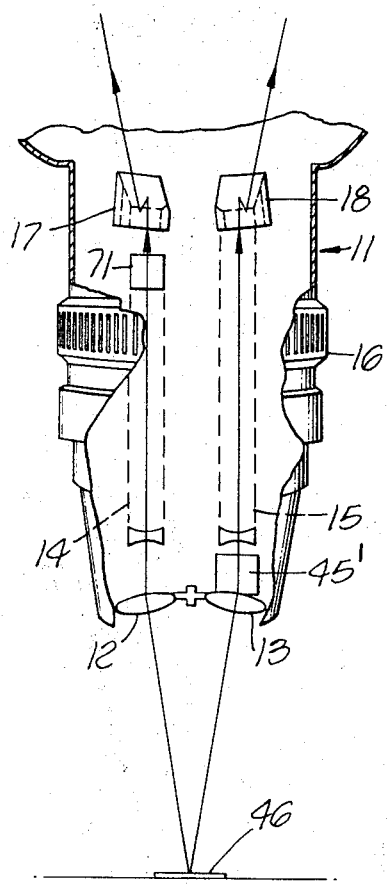
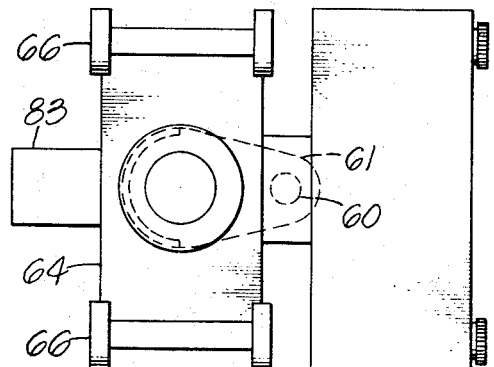
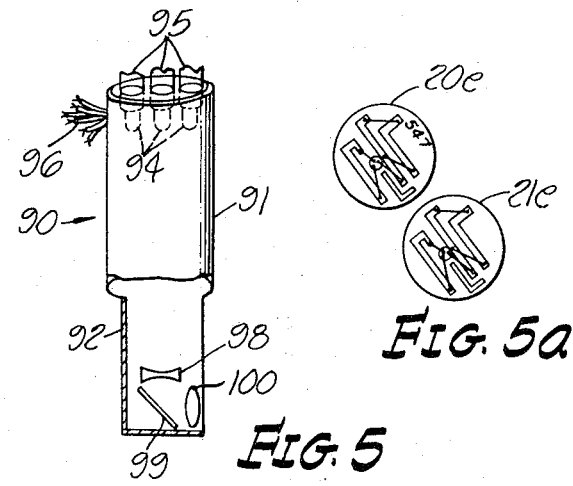
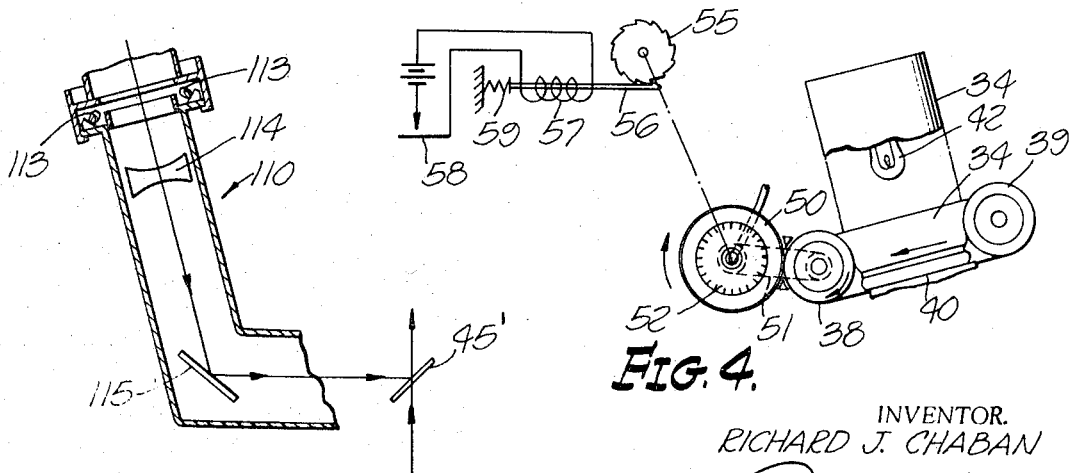

United States Patent Office 3,565,534
Patented Feb. 23, 1971

3,565,534
MICROSCOPE SYSTEM WITH INFORMATIONAL MODULAR AIDS
Richard J. Chaban, Northridge, Calif., assignor to McBain Instruments, Inc., Van Nuys, Calif., a corporation of California
Filed July 19, 1968, Ser. No. 746,059
Int. Cl. G02b 21/20, 23/04
U.S. Cl. 356—162
36 Claims

ABSTRACT OF THE DISCLOSURE

Microscope apparatus with instructional aids particularly useful in assembling and checking miniature and subminiature components, the apparatus employing microscope optical systems and one or more beam splitter means to introduce assembly and checking information into a selected eyepiece for simultaneous observation by the operator along with the component itself. If the equipment is being used in a complex operation the information required by the operator is preferably supplied in separate increments as the work progresses. If a zoom or other magnification changing lens system is present in the basic microscope equipment, as is desirable, one beam splitter may be located below the magnification changing system and the second beam splitter may be located above the magnification changing system to introduce information into the other eyepiece independently of the magnification changing system. A camera accessory can be incorporated and used to make a photo record of semi or fully completed assembly operations. The auxiliaries or instructional aids usable with the invention microscope include means for introducing instrument readings into the optical system from instrumentation connected to components undergoing inspection, measurement or assembly in the main field of the equipment, as well as means for simultaneously introducing auxiliary instructional information from separate sources into one or both of eyepieces of the apparatus and including means for superimposing a representation of the component on the actual image of the component and for performing all aligning operations along X, Y and Z and theta axes as respects such supplemental information source. The invention apparatus also includes provision for varying the magnification of informational workpiece images by precisely the same ratio.

---

The invention relates to microscope equipment and more particularly to a unique and improved microscope apparatus incorporating a number of modular accessories and auxiliaries for expediting and facilitating the assembly of miniature components while simultaneously viewing assembly instructions and information and the workpiece itself as the work thereon progresses.

It is common practice in present day technology to use microscope equipment in the assembly of miniature mechanical and electronic components, this practice being particularly wide spread in the manufacture of mechanical mechanisms, as timepieces, and integrated electronic assemblies. For example, in the wiring and assembly of integrated circuitry it is necessary to make numerous electrical connections between extremely small components and conductive paths. According to prior techniques it is necessary for the operator to view an enlarged schematic posted in a convenient viewing position and to carry a mental image of a particular operation while transferring his eyes into the eyepiece of the instrument. Frequent repetition of this operation is necessary as the work progresses to check and double check each operation performed on the workpiece. Despite the most painstaking care, this procedure is very tiring and nerve wracking and errors inevitably occur.

It is also sometimes desirable to perform certain inspecting and checking operations at intermediate phases of the entire assembly operation. For example, it may be important to determine whether the current flow or the voltage drop or other similar condition prevails meeting design specifications. Heretofore there has been no convenient and satisfactory mode for making such tests.

By the present invention there is provided improved microscope apparatus utilizing various modular accessories and information aids by which information and instrument readings and values can be introduced into appropriate points along one or both optical axes of the apparatus and utilized by the operator while his eyes are trained on the main field of view or by which camera equipment can be employed to record either an intermediate or final assembly condition. The techniques and principles embodied in the present invention are readily incorporated in modified conventional type microscope equipment of either variable or fixed lens type equipment. The several auxiliaries and informational aids are provided with easily operated disconnects and each is designed to make use of the instrument optical assembly and preferably introduced at points between the objective lens means and the eyepiece means thereby avoiding interfering in any degree with the utility or mode of use of the microscope and while retaining the full efficiency of the basic microscope structure. However, for certain operations supplemental images may be introduced into the equipment eyepiece from entry points located closely below the objective lens.

One of the particularly useful accessories is adapted to introduce instructions, as for example, a drawing of a portion of the workpiece undergoing processing by way of beam splitter means located between the objective lens means and the magnification changing system along with an image of the workpiece itself enroute to the eyepiece. A second and identical image of the workpiece may be introduced into another eyepiece such as a conventional binocular system through parallel-arranged optical systems, thereby enabling the operator to see a greatly magnified view of the workpiece alone in one eyepiece and an identical image thereof in the other eyepiece along with a superimposed view of appropriate assembly instructions, either in symbols, a drawing incorporating certain changes to be performed by the operator, or both.

A second auxiliary may be arranged to introduce other and different information through a beam splitter located above the associated one of the variable lens systems with the result that the latter information is viewable in the first mentioned eyepiece and preferably in an area to one side of the viewed object. It will therefore be evident that the variable lens control will operate to magnify the component itself simultaneously with the first mentioned portion of the instructions whereas the second set of instructions, appearing only in the other eyepiece, are unaffected by the variable control. If the separate sets of information are contained on strip film, as is desirable, simple, interrelated feed mechanisms operate to index the next set of information simultaneously into viewing position using a suitable control.

Still another auxiliary can be substituted for one of the information supply accessories, as for example, a digital instrument read-out device effective to cast an image of the instrument reading into one of the eyepieces thereby displaying the values measured by an instrument connected in circuit with a portion of the workpiece. The other information source can be utilized to cast the correct specification reading into the other eyepiece.

Another auxiliary includes provision for supporting a camera in alignment with one of the two optical axes of the microscope. Desirably, the camera auxiliary is mounted on a turret head along with a cassette holder for the informational film. By rotating the turret head, either the cassette or the camera can be brought into operating alignment with the optical axis and an associated one of the beam splitters can be shifted between its alternate operating positions.

Accordingly, it is a primary object of the present invention to provide an improved and unique microscope apparatus having provision for introducing supplemental information into the optical system along with an image of the workpiece undergoing processing.

Another object of the invention is the provision of binocular microscope equipment having means for introducing supplemental information into the eyepiece along one only of its two optical axes and including means for aligning the supplemental image with an image of a workpiece along X, Y and Z axes and about the optical axis of the informational image.

Another object of the invention is the provision of microscope apparatus having provision for selectively utilizing one or more of various modular supplemental informational aids and for introducing this information into one or more of the apparatus eyepieces along with an image of a workpiece in the viewing field of the apparatus.

Another object of the invention is the provision of an improved method and means for simultaneously viewing digital instrument information and a workpiece to facilitate an inspection and/or a service operation.

Another object of the invention is the provision of an improved method of performing work upon a miniature component by the aid of microscope equipment having one or more optical systems including the steps of periodically advancing assembling information into the instrument optical system of one eyepiece and viewing the work undergoing processing through one or more eyepieces and performing the next operation after advancing new assembly information into viewing position through the eyepiece.

Another object of the invention is the provision of an improved method of performing delicate operations on miniature components by simultaneously viewing the work and instructional information through the eyepieces of microscope equipment and including the steps of sequentially introducing new instructional information into the field of view as the work progresses and making alignment changes, if necessary, in the instructional information to maintain the image thereof sharply defined and properly oriented.

Another object of the invention is the provision of microscope equipment and a method of utilizing microscope optical assemblies in assembling and checking extremely small components and in making photo records of one or more assembly stages including readings of instrument readout values when connected in circuit with a selected component or subassembly undergoing processing or servicing.

These and other more specific objects will appear upon reading the following specification and claims and upon considering in connection therewith the attached drawings to which they relate.

Referring now to the drawings in which a preferred embodiment of the invention is illustrated.

FIG. 1 is an elevational view partly in section of one preferred embodiment of the invention microscope with two informational auxiliaries in operating position;

FIG. 2 is a fragmentary view through the lower half of the microscope optical system;

FIG. 3 is a top plan view of the turret head auxiliary;

FIG. 4 is a schematic view of a portion of another auxiliary including a schematic representation of the stepping control for the film feed mechanism;

FIG. 5 is a fragmentary view of another of the auxiliaries partly in section and useful in feeding digital readout information into the optical system from a measuring instrument;

FIG. 5a is a schematic illustration of the image of an object viewable in each of the eyepieces and showing a typical instrument reading as viewed in the left hand eyepiece of the microscope when using the FIG. 5 auxiliary;

FIG. 6 is a fragmentary and partly schematic view of another information supply accessory;

FIG. 7 is a fragmentary view of the turrent head accessory with the parts positioned for use with the camera;

FIG. 8 is a fragmentary view of the structure used to rotate the upper beam splitter, used in connection with the turret head accessory, the full lines showing the position of the parts when the camera is in use and the dot-and-dash lines showing the position when the film strip is in operating position; and FIG. 9 is a sectional view taken along line 9—9 on FIG. 1.

Referring initially more particularly to FIG. 1, there is shown a binocular microscope designated generally 10 suitably supported by a standard not shown. It will be understood that various other types of microscope equipment including monocular, compound binocular and others are equally suitable for use in practicing the principles of this invention, a fact which will become apparent to persons skilled in the microscope are as this disclosure is read. Accordingly a binocular system has been selected as typical and not in a limiting sense. Main body 11 encloses a conventional pair of parallel optical systems including a left and right objective 12, 13 mounted at the lower end of the main housing and aligned with the left and right hand conventional zoom or other variable lens systems 14, 15 and simultaneously adjustable by rotation of a common adjusting ring 16. The optical axis of each zoom system passes through a respective diversion prism 17, 18 into an associated one of the magnifying eyepieces 20, 21.

A first module or informational auxiliary accessory 25 is shown adjustably supported at the upper end of an L-shaped tubular housing 26 having its shorter horizontal leg 27 opening laterally through the side wall of the housing for objective lens 13. A second module or auxiliary accessory, designated generally 30, includes a tubular housing 31 having a shouldered lower end sized to have a snug telescopic fit within a socket 32 opening vertically through the top of main body 11 in an area overlying the optical axis of zoom assembly 14. As will be explained in greater detail below, accessory 30 and its tubular support 31 may be detached and replaced by a different type accessory as, for example, accessory 90 illustrated in FIG. 5.

Referring now to module 25, it will be understood that as here shown this accessory includes a housing 34 provided with suitable precision components for making alignment adjustments of any informational image therein with another image such as that of the component located in the viewing field of the microscope. As here shown, housing 34 constitutes a cassette enclosing a supply spool 38 and a take-up spool 39 for strip film 40 carrying a series of informational images 40 desired to be introduced in sequence into the instrument optical system. Located in the upper end of housing 34 is a lamp 42 effective to direct a concentrated beam of light downwardly through a film image centered on the optical axis of the accessory. This image is deflected by mirror 44 through lens 45 and is then directed upwardly along the axis of zoom lens system 15 by a beam splitter 45′. Beam splitter 45′ is located on the interior side of objective lens 13 and transmits both the informational image from accessory 25 and the image from workpiece represented at 46 upwardly through zoom system 15, through diverter prism 18, and into the right hand eyepiece 21.

Module 25, is is likewise true of module 30, preferably includes means for making precise fine alignment adjustments for accurately orienting and sharply positioning each image in a desired position in the eyepiece, or in superimposed position on the image of the component being processed, or to compensate for warping of the film or errors in the positioning of successive images thereon. For this purpose the connection between housings 31 and 34 include such adjustments as those shown by way of example in FIG. 1 including a focusing ring 32 having threaded engagement with fine threads formed about the thickened upper end of housing 31. Ring 32 has an inwardly projecting radial flange 32a having a close fit with a groove 32b formed in coupling ring 32c, the latter being held against rotation by a pen 32d extending axially into a well or a groove 32e formed radially across the upper end of housing 31.

The lower face of housing 34 includes a square ring 35 having a close sliding fit with a pair of parallel dovetail keyways 35a formed along the opposite lateral edges of ring 35 and mating with complementally shaped keys extending along the upper surface of a second square ring 35b. The latter ring is likewise movable crosswise of keys and keyways 35a by a pair of similar parallel keys and keyways 35c extending at right angles to keyways 35a and formed between the lower face of ring 35 and the upper face of ring 36. Ring 36 has a precision rotary fit about the upper end of ring 32c and can be rotated about the latter and clamped in any desired adjusted position by a thumb screw 36a having its inner end projecting radially into a groove formed in the exterior side wall of ring 32c.

Ring 35 is readily adjusted to and fro keyways 35a in any suitable manner well known in the optical arts, such as a rack and pinion control assembly 35d, whereas rings 35, 36 are adjustable lengthwise of keyways 35c by a rack and pinion control assembly 35e.

From the foregoing it will be understood that the image-carrying film strip 40 in cassette 34 can be easily adjusted along three different axes X, Y, Z lying at right angles to one another and rotationally about the axis of tube 31 at the user's option, the X axis being controlled by control 35d, the Y axis being controlled by control 35e, the Z axis being controlled by rotating ring 32, and the theta adjustment being controlled by loosening thumb screw 36a and rotating cassette 34 in either direction about ring 32c.

The drive means for film strip 40, as here shown, will be understood as comprising a manually controllable operating knob 50 connected by a chain belt or the like 51 with a take-up spool 38. The annular scale 52 carried by knob 50 is calibrated and numbered to indicate the particular image on the film then in alignment with the accessory optical axis. An alternate and mechanical drive for the film feed mechanism is shown schematically in FIG. 4. Thus, the remote end of the drive shaft carrying knob 50 is equipped with a ratchet wheel 55 and a ratchet 56 mounted on an armature of solenoid 57. Each time the solenoid is energized by a foot or hand operated pushbutton 58, ratchet 56 operates to advance the film strip by one increment. As the solenoid is de-energized spring 59 returns the ratchet so as to enage the next tooth of ratchet wheel 55.

The second mentioned accessory 30, as shown here, is a multi-purpose unit provided with a turret 60 pivotally socketed in a bracket 61 secured to the upper end of microscope housing 31. Turret 60 supports a camera 63 and a film cassette unit 64 constructed similarly to the film cassette for accessory 25, and provided with suitable means, not shown, but similar to that described above in connection with module 25 for aligning any film image with that in the main viewing field of the microscope. As shown in FIG. 1, cassette 64 is aligned with the optical axis of housing 31, the film strip customarily mounted therein being illuminated from its rear side by lamp 65.

The film image is transmitted downwardly onto a mirror 67 rigidly supported in the main housing between the legs of a bracket 68 pivoted to the microscope housing on pivot pin 69. Mirror 67 deflects the film image through lens 70 onto a beam splitter 71 aligned with the optical axis of zoom system 14 (FIG. 2), and thence upwardly through deflecting prism 17 and into the left hand eyepiece 20.

Cassette 64 is adapted to house a film strip carrying informational material and adapted to be advanced into alignment with the optical axis of the accessory 30 from a supply spool means 66 and onto a take-up spool means 66. Desirably, advance of the film strip in unit 64 should be coordinated and synchronized with the advance of film strip 40 in cassette 34. This is accomplished according to this invention by means of a flexible cable drive 68 having one end coupled to one end of the shaft carrying knob 50 of unit 25 and its other end detachably coupled in any suitable manner to take-up roll 66 of informational unit 64. However, if it is desired to advance the two film strips independently of one another then the upper end of shaft 68 is detached from its telescopic connection with take-up spool 66 and the latter is manipulated by hand.

It will be understood that the images appearing on film strip 40 preferably are drawn to the same scale as the elements of workpiece 46 beneath the objective lenses. Accordingly, as viewed in eyepiece 21, the real image and the informational image from film 40 can be superimposed directly on one another as viewed in eyepiece 21, whereas the operator will see only the image of the workpiece itself in eyepiece 20.

Since beam splitter 71 for the information supplied from the film unit 64 is located above the associated zoom lens system 14, this supplemental information will be magnified only by the optical system located between beam splitter 71 and the operator's eye and will not be affected by adjusting zoom control ring 16.

If unit 30 is rotated about mounting spindle 60 for the turret head until camera 63 is in alignment with housing 31, arm 75 rotating with spindle 60 will engage contact 76 and close a circuit through solenoid 77 (FIG. 7) rigidly supported on the main frame of the microscope. As will be observed from FIG. 7, the armature of solenoid 77 is connected by link 80 to a bracket 68 supporting a lens holder 78 and a negative lens 81. Lens 81 is required only in connection with film holder unit 64 and not with the camera. Accordingly, lens 81 is mounted in bracket 68 and is shifted to the right out of the optical path of the camera lens when the latter is rotated into its operating position when the turret head is rotated to move the camera out of operating position, contacts 75, 76 controlling the energizing circuit for solenoid 77 open allowing a spring (not shown) to pivot lens holder 78 counterclockwise to its alternate position within housing 83 and thereby restoring negative lens 81 to its operating position relative to the film in unit 64 and the stationary mirror 67. In this latter position the image from the film in unit 64 is reflected into the upwardly directed beam splitter 71 and thence into eyepiece 20.

Referring now to FIG. 8, it is pointed out that bracket 68 carrying lens holder 78 includes an arm 85 having a lost motion connection 86, 87 with a pivotal mounting for beam splitter 71. The arrangement is such that as lens holder 78 and its supporting bracket 68 rotate through the relatively small arc indicated, beam splitter 71 is rotated 90 degrees about a horizontal axis through the beam splitter and between its two operating positions respectively shown in FIGS. 1 and 8. In the FIG. 1 position of the beam splitter an image from the film in unit 64 is deflected upwardly into eyepiece 20 whereas when the beam splitter is rotated to the position shown in FIG. 8 an image of workpiece 46 or other object positioned beneath the objective lenses 12, 13 is projected upwardly through the zoom system and thence laterally by beam splitter 71 and upwardly into the camera lens. The operator using the equipment can view the object through eyepiece 21 and the camera likewise sees the object by way of objective lens 12, zoom system 14, beam splitter 71, reflecting mirror 67, and lens system 78. The position of the latter can be controlled by the adjusted stop screw 79 mounted in the side wall of tubular housing 31 (FIG. 1).

Referring now to FIGS. 5 and 5a, there is shown an accessory 90 having a tubular body 91 provided with a reduced end 92 sized to fit snugly within socket 32 of the microscope body in lieu of accessory 30. Accessory 90 includes one or more digital or symbol readout tubes 94 supported in sockets 95 each having a pair of electrical conductors 96 extending to instrumentation (not shown) connectible in circuit with portions of the electrical circuit forming part of workpiece 46 undergoing assembly or processing by the aid of the microscope. The miniature readout tubes 94 are of a type well known to persons skilled in the miniature instrumentation field and each is adapted to indicate a particular digital value measured by an associated measuring instrument in circuit with the workpiece. The image of these tubes is conveyed downwardly through housing 91, through the negative lens 98 and is reflected by mirror 99 through lens 100 onto beam splitter 71 and thence into eyepiece 20. Lamps 94 are preferably so positioned that their images appear in an area of the eyepiece not occupied by the image of elements of the workpiece. Thus the left hand circle in FIG. 5a representing the view appearing in eyepiece 20 indicates that the instrument readout is "547."

OPERATION

The operation of the disclosed microscope apparatus in a typical one of its numerous applications will now be described, namely, to complete electrical connections between elements of a subminiature or integrated electronic component 46. The circuit elements exposed on the top side of the insulation plaque occupies only a very small area directly beneath the optical axis of microscope 10. Before positioning or fixing component 46 to the stage of the instrument, accessory unit 34 is loaded with film 40 carrying one or more images of component 46 in different stages of completion and usually showing only a portion of the component and a few of the connections to be completed by the operator.

The microscope is adjusted most expeditiously by bringing the first instruction image on film 40 into proper viewing position in the field of view of eyepiece 21. For example, let it be assumed that circle 21b, FIG. 1, represents the view of the first image on film 40. This image includes a showing of a portion of the circuitry components comprising the odd shaped strips in circle 21b. Interconnecting different ones of these strips are straight lines 120, 121 representing electrical connections to be completed by the operator. After the image has been properly centered in the eyepiece, as indicated in circle 21b, the operator adjusts the actual workpiece 46 in the field of the view of the microscope until the corresponding part of the workpiece 46 is accurately superimposed on the image from the film in eyepiece 21, a condition accurately represented in circle 21b. The various and appropriate ones of controls 32, 35d, and 35e may also be adjusted as necessary or convenient in accurately and sharply superimposing the supplemental or informational image on the image of component 46. Eyepiece 20 provides the operator with a clear view of the workpiece without any electrical connections interconnecting the integrated circuitry elements. In other words, eyepiece 20 provides the operator with a clear and direct view of the workpiece or main image whereas eyepiece 21 provides a corresponding view of the workpiece along with a superimposed film or supplemental image of the same circuit elements along with the location of the electrical connections to be soldered in place on the workpiece. It is also pointed out that if the instructional film image is not present, then the operator has an identical view of the workpiece, a condition represented in circles 20a, 21a.

Proceeding now to the two pairs of circles 20c, 21c, it will be noted that certain curly lines appear in both circles. These lines represent electrical connections after one end has been bonded to a circuit element at a point directed by the informational image appearing in circle 21c. After one end of each connection has been completed, the operator proceeds to bond the other end in place in accordance with the instructions provided by the instructional image appearing in the right hand eyepiece. After the connections have been completed they will generally overlie the instruction image appearing in the right hand eyepiece and the view as observed in both eyepieces should correspond, a condition indicated in circles 20d, 21d. If the operator wishes to enlarge the showing or to decrease the image of the workpiece at any time, he merely adjusts zoom control ring 16 in the appropriate direction. The informational image as well as that of the workpiece is amplified in the same ratio since both images pass through identical zoom optical systems 14, 15.

After the connections in one portion of a workpiece have been completed, push button 58 of the film feed mechanism (FIG. 4) is closed momentarily to advance the next instructional image into position and align with respect to its X, Y, Z or theta axes if necessary until an image of a corresponding portion of its circuitry is accurately superimposed on the new object image, as the operator proceeds to follow the film instructions in completing the next set of electrical connections. If desired, and particularly in more complex assemblies, the various electrical connections on the informational film may be in different colors to facilitate identification of the different connections and to assist the operator in distinguishing between different connections and the order in which they are preferably completed.

In certain assembly operations the operator may have need for checking electrical values of certain connections as made or before proceeding with others. In this case accessory 90 shown in FIG. 5 is inserted in socket 32 of the microscope and lead wires 96 for the digital readout tubes are connected to a suitable measuring instrument having probes manipulatable by the operator for contact with appropriate portions of the workpiece as observed through eyepieces 20, 21. The value sensed by the measuring instrument is employed to activate the readout tubes 94 and images of these values are introduced into beam splitter 71 and then into eyepiece 20 and are observed by the operator who can also observe that the probes are in fact in contact with correct elements of the circuit. The reading represented by readout tubes 94 in circle 20e, FIG. 5A, is 547. If this is the correct value the operator then proceeds with other connections. If it is not the correct value, the workpiece is unacceptable and is rejected.

In certain cases a record of the connections actually made may be desired as documentary evidence of a proper assembly. In this case before proceeding with other connections, the operator rotates unit 30 180° to align the lens of camera 63 with the axis of tube 31. As the camera pivots into position, arm 75 engages contact 76 and completes an electric circuit to solenoid 77. Energization of this solenoid causes the solenoid armature 77' to shift bracket 68 carrying lens assembly 78 into alignment with the camera lens. At the same time negative lens 81 is shifted out of position and beam splitter 71 is rotated 90° counterclockwise so that an image of workpiece 46 is deflected by the beam splitter onto mirror 67 and thence into the camera lens. After a picture has been taken, the camera can be rotated back to its alternate position de-energizing the circuit through solenoid 77 and allowing an associated spring, not shown, to restore lens assembly 78 to its retracted position in housing 83, and also restoring beam splitter 71 to the position shown in FIG. 1.

The film information provided by accessory 64 when positioned as shown in FIG. 1 is useful to feed printed or other instructions into eyepiece 20 in the same manner as the information supplied from accessory 25. These instructions do not pass through zoom lens assembly 14 and accordingly are not enlarged or diminished in size by adjusting zoom control ring 16. The information so supplied usually does not embody a duplication of a portion of the workpiece image. For this reason it is not necessary to align the image of the workpiece with that of the instructional material from accessory 64. However, it is desirable that the supplemental instructions provided by accessory 64 be coordinated with a related image on film 40. This objective is achieved by the use of the flexible shaft 63 and the solenoid actuated ratchet drive 55, 56 which cooperates to advance the strip in unit 64 simultaneously with film strip 40.

Accessory 110, FIG. 6, is generally similar to accessory 25 except that it is usable with an actual specimen or information imprinted on opaque strip advanced in the plane of surface by suitable means. When using this type of opaque information the downwardly facing image requires suitable illumination such as that provided by lamps 113. Rays from the image pass downwardly through negative lens 114 onto mirror 115 and thence to beam splitter 45' positioned as described above in connecion with FIG. 1. Although not shown, it will be understood that the informational images may be advanced in increments from supply takeup rolls corresponding to those described in connection with accessory 25.

While the particular microscope inspection and assembly apparatus herein shown and disclosed in detail is fully capable of obtaining the objects and providing the advantages hereinbefore stated, it is to be understood that it is merely illustrative of the presently preferred embodiments of the invention and that no limitations are intended to the details of construction or design herein shown other than as defined in the appended claims.

1. Binocular microscope apparatus for use in introducing into the field of view information useful in inspecting and processing miniature electronic components, said apparatus having an optical system including two optical axis defined by separate binocular type eyepieces and at least one objective lens, beam splitter means located along one of said optical axes between a single one only of said binocular type eyepieces and said objective lens and effective to transmit an image upwardly into said one binocular eyepiece from a supplemental image source on one side of said one optical axis, and means for introducing the image from said supplemental source through said beam splitter for transmittal by the beam splitter into said one eyepiece for viewing superimposed on an image of an object centered beneath said objective lens, whereby the operator can view the object superimposed on the supplemental image through one eyepiece and the object alone through the other eyepiece.

2. Microscope apparatus as defined in claim 1 characterized in the provision of means rigid with said apparatus and including optical means mounted thereon laterally of the said one optical axis and in optical communication therewith at a point between said objective lens and said one eyepiece and along which said supplemental image is transmitted to said one eyepiece via said beam splitter means.

3. Microscope apparatus as defined in claim 2 characterized in that said rigid means for introducing a supplemental image into said one optical axis includes control means for substituting one supplemental image source with another supplemental image source.

4. Microscope apparatus as defined in claim 3 characterized in that said means for introducing a supplemental image into said one optical axis via said beam splitter means includes a series of supplemental images arranged in a row and including means for advancing said images individually into viewing position from said one eyepiece.

5. Microscope apparatus as defined in claim 4 characterized in that said supplemental images are carried on strip material.

6. Microscope apparatus as defined in claim 4 characterized in that said means for advancing supplemental images includes manually operable control means for advancing said images in increments of predetermined length.

7. Microscope apparatus as defined in claim 1 characterized in that said optical system includes regulatable means for varying the magnification of the object being viewed simultaneously with the supplemental image and in exactly the same ratio.

8. Microscope apparatus as defined in claim 1 characterized in that said apparatus includes means rigid therewith and operable to introduce a second supplemental image into said optical system at a point between said objective lens and said eyepieces by means including second beam splitter means.

9. Microscope apparatus as defined in claim 8 characterized in that each of said supplemental images is carried on strip means on which is located a plurality of images repsectively related to successive images on the other of said strips.

10. Microscope apparatus as defined in claim 9 characterized in the provision of control means for simultaneously advancing related pairs of images on said two strips into position for introduction into a respective one of said beam splitter means.

11. Microscope apparatus as defined in calim 10 characterized in that each of said beam splitter means is located to project separate supplemental images into a separate one of said binocular type eyepieces.

12. Microscope apparatus as defined in claim 8 characterized in the provision of camera means having lens means alignable with said optical system for use in making a film record of the object located in the viewing field of said microscope apparatus.

13. Microscope apparatus as defined in claim 14 characterized in the provision of means operable as said camera means is moved into operative position to rotate the associated one of said beam splitter means to divert light from the object being viewed from said other of said eyepieces into the lens of said camera means and leaving the object located in the main viewing field of said apparatus viewable through said one eyepiece.

14. Microscope apparatus as defined in claim 12 characterized in the provision of turret means for pivotably supporting said camera means for movement between first and second positions, the lens of the camera being aligned in said first position with an associated one of said beam splitter means and operable to transmit light from the object being viewed onto film in said camera means, and said camera means in the second pivotal position being disposed to one side of said light transmitting path.

15. Microscope apparatus as defined in claim 14 characterized in that in the second position of said camera said second supplemental image means is aligned to transmit a second supplemental image to the other of said eyepieces.

16. In combination, binocular microscope apparatus having first and second main optical axes each equipped with manually regulatable variable magnifying lens means between the objective lens means and the eyepiece means thereof, that improvement which comprises: first and second beam splitter means located in a respective one of said optical axes, one of said beam splitter means being located in the first of said optical axes between an objective lens and the associated variable lens means and the second beam splitter means being located in the second main optical axis between the other of said variable lens means and the associated eyepiece, and means for utilizing each of said beam splitters to transmit to the eyepieces information useful to an operator in processing an object located in the viewing field of said two objective lenses.

17. The combination defined in claim 16 characterized in the provision of means for shifting the second of said beam splitter means between first and second operative positions in the first of which said beam splitter means is operable to transmit light to one of said eyepieces and in the second of which it is operable to transmit light from the viewing field of said objective lens to a camera station on said apparatus.

18. The combination defined in claim 17 characterized in the provision of camera means having lens means axially aligned with the second main optical axis at its intersection with said second beam splitter means, means at said camera station to seat selectively said camera means and informational image means useful to the operator when viewing an object in the field of view of said apparatus, and means for moving said second beam splitter means between first and second positions in the first of which light is transmitted from the field of view to said camera means and in the second of which light is transmitted from an informational image at said camera station to one of said eyepieces.

19. The combination defined in claim 18 characterized in the provision of means for shifting said second beam splitter means between the first and second positions thereof as the camera means is moved into and out of operating position at said camera station.

20. The combination defined in claim 16 characterized in that said informational image means includes means for providing an image of an instrument reading for viewing by an operator in one of said eyepieces and useful in checking the condition of material in the viewing field of said microscope.

21. The combination defined in calim 16 characterized in the provision of film strip means including a film strip optically associated with each of said first and second beam splitter means and provided with pairs of coordinated images arranged in sequence along the respective film strips with an image of each pair viewable through a respective one of said eyepieces.

22. The combination defined in claim 21 characterized in the provision of common drive means for said two film strips operable to advance the same simultaneously by selected related increments.

23. The combination defined in claim 22 characterized in that said common drive means comprises magnetically operated means.

24. The combination defined in claim 22 characterized in that said common drive means includes flexible cable means extending between said two film strips.

25. That method of assembling miniature electronic components difficult to see by the unaided eye which method comprises: placing a component unit to be processed in the viewing field of the dual objective lens of binocular microscope equipment having beam splitter means located above one only of its dual objective lens, and utilizing said beam splitter means to transmit an image upwardly through one eyepiece to one eye of the operator which image includes an image of the component unit being worked upon by the operator using said microscope equipment superimposed upon a supplemental image of information useful to the operator, and utilizing the other binocular eyepiece to observe the object in the viewing field free of obstruction by said informational image.

26. That method defined in claim 25 characterized in the step of transmitting an informational image to said one eyepiece which image comprises an image corresponding to the object in the field of view with certain changes incorporated therein and useful to the operator as a guide in performing work upon the object.

27. That method defined in claim 25 characterized in the steps of placing a miniature component in the viewing field of the microscope for the purpose of performing work operations thereon, superimposing an image corresponding to said miniature component on the image of the component itself as viewed through said one eyepiece along with a showing of changes to be made thereon by the operator, and utilizing said superimposed images as a guide to the operator in performing a work operation and as a check in determining when the operation has been properly performed.

28. That method defined in claim 27 characterized in the step of replacing a prior informational image with successive additional informational images showing successive operations to be performed on the component until a series of operations have been carried out.

29. That method defined in claim 28 characterized in displaying the informational images in a manner to emphasize and distinguish the current operation information from other details in the field of view.

30. That method defined in claim 25 characterized in the steps of utilizing binocular microscope equipment having manually adjustable variable magnifying lens means between the dual objective lens and the binocular eyepieces, and locating said beam splitter means between said one objective lens and said variable lens means whereby said informational image is magnified simultaneously with and in the same proportion as the component located in the field of view.

31. That method defined in claim 30 characterized in the step of placing second beam splitter means between said variable magnifying lens means and the other of said binocular eyepieces, and utilizing said second beam splitter means to introduce second informational matter into said other eyepiece in magnified form unaffected by an adjustment of said variable lens means.

32. That method defined in claim 31 characterized in substituting camera means for second second informational image means, shifting said second beam splitter means to a position to direct light from the component undergoing assembly into said camera, and utilizing said camera to make a photo image of the component while leaving said one eyepiece available for use by the operator in viewing the component being photographed.

33. That method of servicing and processing miniature components not readily visible to the unaided eye which comprises, locating a component to be serviced in the viewing field of objective lens means of microscope equipment housing powerful magnifying components including eyepiece means, using said eyepiece means to observe manipulation of measuring instrument probes as said probes are properly positioned on elements of the component being serviced to make a desired measurement thereon, and introducing an image of the readout values of the measuring instrument into the eyepiece means along the optical axis of said microscope equipment for viewing by the operator while simultaneously observing the components and the measuring instrument probes through said eyepiece means.

34. That method defined in claim 33 characterized in the step of locating the image of said measuring instrument readout values in a viewing area of said eyepiece means offering minimum interference with a view of said probes and the contact points therefor on the component undergoing servicing in the viewing field of said microscope equipment.

35. Microscope apparatus as defined in claim 8 characterized in that said second supplemental information means includes means for introducing electronic readout value images into said eyepiece means whereby an operator observing a component undergoing servicing in the apparatus field of view can be guided by the observed electronic readout value while performing the servicing operation.

36. That method defined in claim 33 characterized in the step of introducing images of said measuring instrument readout values into said eyepiece in digital form for observation by the operator along with duplicate images of the component undergoing servicing.

(References on following page)

References Cited

UNITED STATES PATENTS

| | | | |
|---|---|---|---|
| 2,209,532 | 7/1940 | Michel | 350—19 |
| 2,423,370 | 7/1947 | Butscher | 350—30 |
| 2,510,145 | 6/1950 | Short | 350—30 |
| 2,674,152 | 4/1954 | Wilkinson | 350—30 |
| 2,737,079 | 3/1956 | Brown et al. | 350—19 |
| 2,790,347 | 4/1957 | Link et al. | 350—30 |
| 3,124,682 | 3/1964 | Kojima et al. | 350—19(UX) |
| 3,398,630 | 8/1968 | Dakin | 350—10 |
| 3,393,288 | 7/1968 | Barstow et al. | 350—81 |

FOREIGN PATENTS

| | | | |
|---|---|---|---|
| 1,101,807 | 1961 | Germany | 350—19 |

RONALD L. WIBERT, Primary Examiner

J. ROTHENBERG, Assistant Examiner

U.S. Cl. X.R.

29—574, 593; 350—30, 81, 18, 19; 356—168